(12) United States Patent
Singh (10) Patent No.: US 11,463,007 B2
(45) Date of Patent: Oct. 4, 2022

(54) POWER SUPPLY CIRCUIT WITH MULTIPLE STAGES FOR CONVERTING HIGH VOLTAGE TO LOW VOLTAGE AND POWER TRAIN HAVING THE SAME

(71) Applicant: Deere & Company, Moline, IL (US)

(72) Inventor: Brij N. Singh, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 82 days.

(21) Appl. No.: 16/990,238

(22) Filed: Aug. 11, 2020

(65) Prior Publication Data

US 2021/0075325 A1 Mar. 11, 2021

Related U.S. Application Data

(60) Provisional application No. 62/897,841, filed on Sep. 9, 2019.

(51) Int. Cl.
*H02M 3/158* (2006.01)
*H02M 3/335* (2006.01)
(Continued)

(52) U.S. Cl.
CPC ........ *H02M 3/1584* (2013.01); *H02M 1/0009* (2021.05); *H02M 1/0064* (2021.05)

(58) Field of Classification Search
CPC .......... H02M 3/335; H02M 1/36; H02M 1/40; H02M 3/1584; H02M 3/1588; H02M 1/0064; H02M 1/0009
See application file for complete search history.

(56) References Cited

U.S. PATENT DOCUMENTS

| 2003/0174528 A1* | 9/2003 | Wong | H02M 3/156 363/147 |
| 2010/0026208 A1* | 2/2010 | Shteynberg | H05B 47/165 315/297 |

(Continued)

FOREIGN PATENT DOCUMENTS

| WO | WO 01/26207 A2 | 4/2001 | |
| WO | WO-0126207 A2 * | 4/2001 | .......... H02M 1/4258 |
| WO | WO 03/079527 A2 | 9/2003 | |

OTHER PUBLICATIONS

European Search Report issued in counterpart application No. 20193211.8 dated Jan. 26, 2021 (09 pages).

*Primary Examiner* — Sisay G Tiku
(74) *Attorney, Agent, or Firm* — Crowell & Moring LLP (57) ABSTRACT

A power supply circuit for converting a first voltage to a second voltage where the first voltage is greater than the second voltage, and a power train having the same, are provided. The power supply circuit may have multiple stages and each stage of the power supply circuit may include a first circuit block configured to provide a start-up power to a second circuit block; a second circuit block configured to generate a Pulse-Width-Modulation (PWM) signal that controls a pulse duration of a transistor; a third circuit block configured to activate or deactivate the transistor based on the PWM signal; a fourth circuit block configured to reset a magnetic flux in a transformer to a zero state when the transistor is deactivated; and a fifth circuit block configured to maintain an output of a stage below a predetermined value by adjusting a voltage across the transformer.

18 Claims, 4 Drawing Sheets

(51) Int. Cl.
*H02M 1/00* (2006.01)
*H02M 1/40* (2007.01)
*H02M 1/36* (2007.01)

(56) References Cited

U.S. PATENT DOCUMENTS

| | | | |
|---|---|---|---|
| 2011/0019446 A1* | 1/2011 | Wu | H02M 3/33523 363/79 |
| 2011/0096574 A1* | 4/2011 | Huang | H02M 3/33507 363/21.18 |
| 2012/0170322 A1* | 7/2012 | Thomas | H02M 3/33569 363/16 |
| 2017/0288553 A1* | 10/2017 | Fahlenkamp | H02M 3/33523 |
| 2017/0288554 A1* | 10/2017 | Fahlenkamp | H02M 1/08 |
| 2019/0044449 A1* | 2/2019 | Li | H02M 3/33592 |
| 2019/0052175 A1* | 2/2019 | Gritti | H02M 3/33507 |
| 2019/0140474 A1 | 5/2019 | Stolz et al. | |
| 2019/0207522 A1* | 7/2019 | Sato | H02M 3/33523 |
| 2021/0006166 A1* | 1/2021 | McLean | H02M 3/3374 |
| 2021/0329759 A1* | 10/2021 | Liu | H05B 45/14 |

\* cited by examiner

POWER SUPPLY CIRCUIT WITH MULTIPLE STAGES FOR CONVERTING HIGH VOLTAGE TO LOW VOLTAGE AND POWER TRAIN HAVING THE SAME

CROSS-REFERENCE TO RELATED APPLICATION

The present application claims the benefit of U.S. Provisional Application No. 62/897,841 filed Sep. 9, 2019, which is incorporated herein by reference in its entirety.

GOVERNMENT LICENSE RIGHTS

This invention was made with the United States government support under contract or award DE-EE0006521 awarded by the United States Department of Energy. The United States government has certain rights in the invention.

TECHNICAL FIELD

The present disclosure relates to a power supply circuit having a plurality of stages for converting direct current (DC) power from a high voltage to a low voltage.

BACKGROUND

The statements in this section merely provide background information related to the present disclosure and may not constitute prior art.

When a power inverter drives a high-speed and high-back electro-motive-force permanent magnet (PM) motor, a risk of power electronics hardware failure due to excessive voltage in inverter DC bus may exist. However, this may be managed by supplying demagnetizing current from an inverter, resulting in the flux weakening of PM motor. It is noted that demagnetizing current can only be supplied if control system of the inverter is intact and fully functional, and the inverter may no longer be able to supply sufficient demagnetizing current to a PM machine while it is spinning at high-speed. One scenario for this failure could be if a harness from a vehicle battery to the inverter is either open or has an intermittent connection. This requires a dedicated power supply that draws necessary power to keep inverter control board fully powered, and hence fully functional, unless commanded otherwise from vehicle's transmission control unit (TCU).

Input of this dedicated power supply must be connected across high voltage DC bus of the inverter and should provide electrically isolated power output of hundreds of watts.

Previous conversion from high-voltage DC bus (~700 VDC) to 15 VDC electrically isolated output power (~35 Watts) has been attempted. However, the power supply used for that conversion may have numerous drawbacks, such as bulky size, cost, excessive heat-loss in its power components, etc. Also, such a power supply is not suitable for high-temperature application of power inverter due to thermal issues it may face even with 70° C. WEG (water ethylene glycol) coolant flowing through the inverter thermal management system.

These issues could become even more challenging when the inverter DC bus voltage is raised above 1000V. A MOSFET of higher voltage may be needed which has a higher Rds_on (on-state resistance) at a higher DC bus voltage, and an isolation transformer creepage distance should meet reinforced insulation requirements. As a result, its size becomes larger corresponding to the voltage.

SUMMARY

The present disclosure uses a modular concept to develop a multiple-stage power conversion. The modular and scalable power supply system yields an electrically isolated low-voltage power source and the multiple-stages are connected in series and depend upon a level of voltage at an input stage.

In one form of the present disclosure, a power supply circuit with a plurality of stages for converting a first voltage to a second voltage where the first voltage is greater than the second voltage is provided. The power supply circuit may include a first circuit block configured to provide a start-up power to a second circuit block; the second circuit block configured to generate a Pulse-Width-Modulation (PWM) signal that controls a pulse duration of a transistor; a third circuit block configured to activate or deactivate the transistor based on the PWM signal; a fourth circuit block configured to reset a magnetic flux in a transformer to a zero state when the transistor is deactivated; and a fifth circuit block configured to maintain an output of a stage below a predetermined value by adjusting a voltage across the transformer.

The first circuit block may include a first diode electrically connecting a resistor and a first capacitor, wherein the resistor and the first capacitor are connected to an input of the stage; and a second diode electrically connecting a second capacitor and the fifth circuit block, wherein the first diode and the second diode are configured to maintain a voltage across a third capacitor included in the fifth circuit block greater than a voltage across the first capacitor when a power supply in the stage is above a predetermined threshold.

The second circuit block may include a PWM generator electrically connected to a PWM controller. The PWM generator may be configured to generate a logic signal indicating whether a sufficient voltage is present at the stage when a voltage across the second capacitor reaches a predetermined state.

The third circuit block may include the transistor configured to cause a current flow that builds the magnetic flux in the transformer when the transistor is activated; and to generate a status signal indicating whether an over-current or an under-current is present at the stage.

The fourth circuit block may include a third diode electrically connected to the transformer; and a fourth diode configured to provide a rectified voltage as an input of a next stage, wherein the transformer is configured to isolate the input of the stage from the output of the stage.

The fifth circuit block may include a fifth diode electrically connecting the third capacitor and the transformer, wherein the voltage across the third capacitor is generated to regulate a power flow from the stage to the next stage.

The power supply circuit may further include a status comparator configured to compare the voltage across the second capacitor with the logic signal; and to output a pass signal when the voltage across the second capacitor meets a predetermined threshold; and a digital isolator configured to pass, to another digital isolator included in the next stage, a set of signals including the pass signal, the PWM signal, and the status signal.

A final stage may further include a power converter diagnosis system configured to receive the set of signals; determine whether the stage meets a self-diagnosis measurement; and output a diagnosis signal when the stage is determined to meet the self-diagnosis measurement.

In some forms of the present disclosure, a number of the plurality of stages may be determined based on a voltage at an input of a first stage.

In some forms of the present disclosure, a functional creepage distance or a minimum creepage distance may be maintained within the transformer depending on the stage.

In another form of the present disclosure, a power train in a vehicle is provided. The power train may include a generator connecting an engine and a first power converter; a second power converter connected to a motor, wherein the first power converter and the second power converter are connected through a DC bus; and a power supply circuit with a plurality of stages configured to convert a first voltage to a second voltage where the first voltage is greater than the second voltage, wherein the power supply circuit is connected to the DC bus. The each stage of the power supply circuit may include a first circuit block configured to provide a start-up power to a second circuit block; the second circuit block configured to generate a Pulse-Width-Modulation (PWM) signal that controls a pulse duration of a transistor; a third circuit block configured to activate or deactivate the transistor based on the PWM signal; a fourth circuit block configured to reset a magnetic flux in a transformer to a zero state when the transistor is deactivated; and a fifth circuit block configured to maintain an output of a stage below a predetermined value by adjusting a voltage across the transformer.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is not limited to the matter disclosed below and will be understood in different forms which differ from each other. The examples provided merely make the disclosure complete and provide for fully informing the scope to those skilled in the art.

Throughout this specification and the claims which follow, unless explicitly described to the contrary, the word "comprise" and variations such as "comprises" or "comprising" will be understood to imply the inclusion of stated elements but not the exclusion of any other elements.

Figure 1:
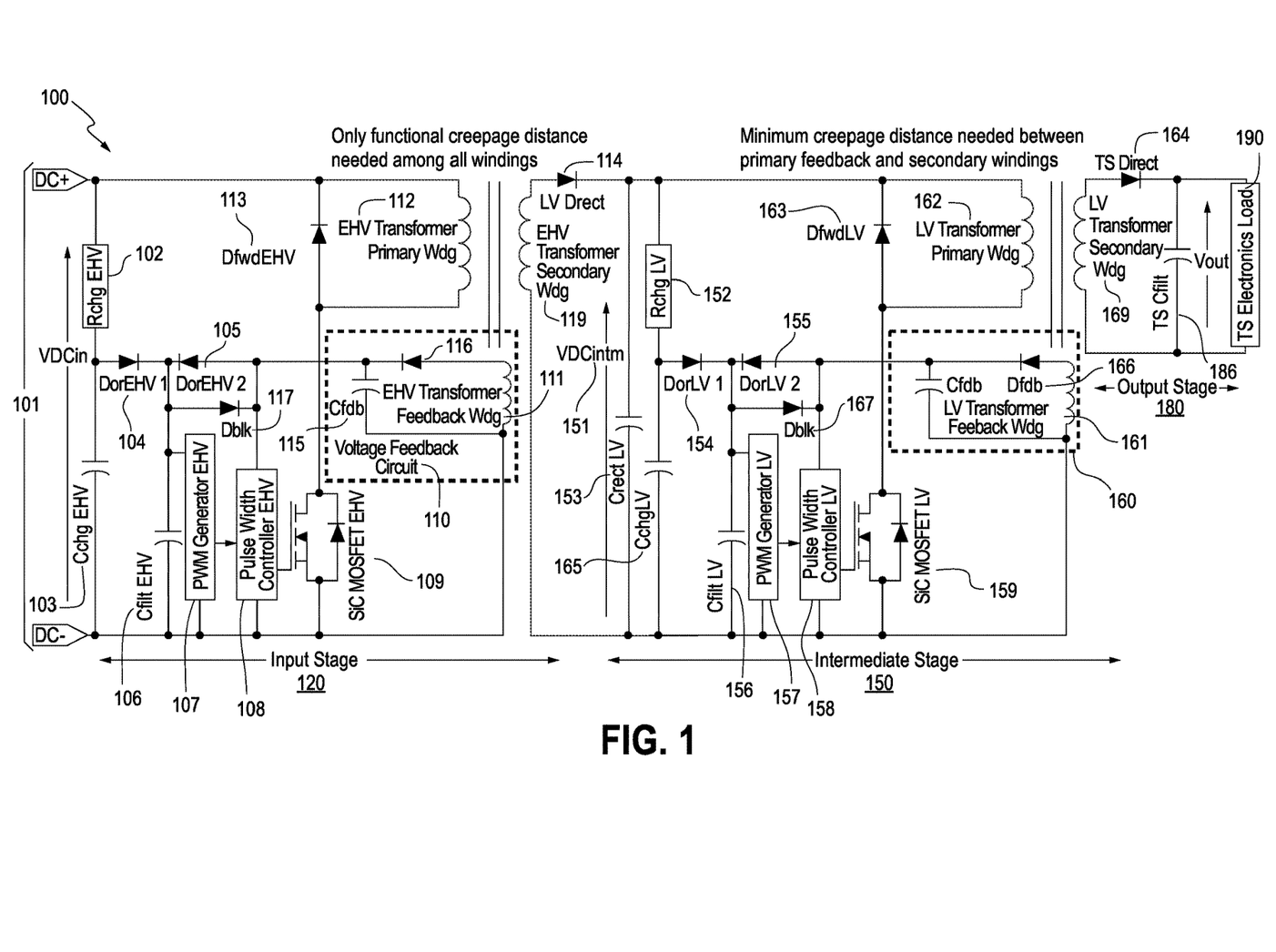
FIG. 1 is a diagram describing a two-stage power supply circuit in one form of the present disclosure.

FIG. 1 shows the input stage 120 of power supply circuit 100. The input stage 120 can be directly connected across a high-voltage (>1000 volts (V)) DC bus of an inverter 101. The voltage of DC bus of the inverter 101 may be as high as 6600V, but preferably 2400V.

The components of the input stage 120 of the power supply circuit 100 include: Rchg EHV 102, Cchg EHV 103, Dblk EHV 117, Dor EHV1 104, Dor EHV2 105, Cfilt EHV 106, Pulse Generator EHV 107, Pulse Width Controller EHV 108, SiC MOSFET EHV 109, EHV Voltage Feedback Circuit 110 and its components: EHV Transformer Feedback Wdg 111, EHV Transformer Primary Wdg 112, Dfwd EHV 113, and Drect LV 114.

Function of these components will be described hereinafter. Trickle charging components Rchg EHV 102 and Cchg EHV 103 are connected across high-voltage (>1000 V) DC bus of the inverter 101 to charge capacitor Cchg EHV 103. A power drawn by this trickle charge circuit is less than a few milliwatts (mW). When Pulse Generator EHV 107 is not switching, the voltage developed across Cchg EHV 103 establishes initial charge across capacitor Cfilt EHV 106. The voltage across Cfilt EHV 106 enables Pulse Generator EHV 107 and it starts producing PWM pulse for SiC MOSFET EHV 109. Also, the voltage across Cfilt EHV 106 powers-up block Pulse Width Controller EHV 108 and component Dblk EHV 117 ensures that voltage developed across Cfdb 115 doesn't conflict with the voltage across Cfilt EHV 106. The Pulse Width Controller EHV 108 implements a look-up table for the input stage 120 of the power supply circuit 100. This look-up table may include power supply start-up characteristics and time-delay to execute start-up of the present power supply circuit 100. The voltage generated by EHV Voltage Feedback Circuit 110 becomes an input to the look-up table implemented in Pulse Width Controller EHV 108. Gate Pulse signal is the output of Pulse Width Controller EHV 108. The look-up table may also include output load-dependent droop characteristics for the input stage 120. For an output load that is within the predefined range, "Gate Pulse" for SiC MOSFET EHV 109 is adjusted based on voltage developed across Cfdb 115. Therefore, the pulse width issued by Pulse Width Controller EHV 108 is adjusted to make sure that the voltage across input (VD-Cintm 151) of the intermediate stage 150 doesn't drift above or below predefined limits.

When SiC MOSFET EHV 109 turns-on and off and timed as per Gate Pulse produced by Pulse Width Controller EHV 108, time varying flux may be developed across EHV Transformer Primary Wdg 112. This time varying flux also links to EHV Transformer feedback Wdg 111 and develops time varying voltage across it. This time varying voltage may be converted to DC feedback voltage by components Dfdb 116 and Cfdb 115. Voltages across Cfdb 115 and Cfilt EHV 106 are diode ORed using components Dor EHV1 104 and Dor EHV2 105. This may help the power supply switching activated and Pulse Generator EHV 107 keeps producing pulses for Pulse Width Controller EHV 108 unless the operation of the input stage 120 drifts beyond droop characteristics programmed in the look-up table. The component Dfwd EHV 113 ensures magnetic flux in the core of EHV Transformer Feedback Wdg 111 and EHV Transformer Primary Wdg 112 doesn't drift up to the saturation level.

FIG. 1 also shows the intermediate stage 150 of the power supply circuit 100. This stage handles far lower voltage (VDCintm 151) (e.g. approximately $\frac{1}{4}^{th}$ to $\frac{1}{3}^{rd}$ of VDCin, which is across the voltage of the DC bus of inverter 101 at the input stage 120). As such, a transformer may be far smaller as compared to a transformer needed for the direct power conversion from the voltage of the DC bus of inverter 101 (greater than 1000 V and up to 6600 v) to less than or equal to 48 V.

The components of the intermediate stage 150 may include: EHV Transformer Secondary Wdg 119, Crect LV 153, Rchg LV 152, Cchg LV 165, Dor LV1 154, Dor LV2 155, Cfilt LV 156, Dblk LV 167, Pulse Generator LV 157, Pulse Width Controller LV 158, SiC MOSFET LV 159, LV Voltage Feedback Circuit 160 and its components: LV Transformer Feedback Wdg 161, LV Transformer Primary Wdg 162, Dfwd LV 166, and Drect TS 164.

The function of these components of the intermediate stage 150 may be the same as the input stage 120, except architecture and content of look-up table programmed in Pulse Width Controller LV 158.

FIG. 1 shows the output stage 180 of power supply circuit 100 that is electrically isolated, and voltage remains at or below 48 V DC in the output stage 180. The components of the output stage 180 handle hundreds of watts power needed by circuits used in power electronics control systems. Electrically isolated as used herein may refer to one or more low voltage (e.g., equal to less than 25 Volts Alternating Current (AC) or 60 Volts Direct Current (DC) isolated circuits and/or electronics assembly (e.g., power supply circuit, converter, or its enclosure) with low current leakage). In some examples, technical specifications for electrically isolated or electrical isolation for electronic assemblies may be established by various standard-setting organizations.

The components of output stage 180 may include: LV Transformer Secondary Wdg 169, Cfilt 186 and Electronics Load 190 to represent the load of power electronics control systems.

The time varying voltage developed across LV Transformer Secondary Wdg 169 is converted to DC voltage using Drect TS 164 and Cfilt TS 186. The DC voltage may become an auxiliary source in parallel with a vehicle battery. When the vehicle battery fails to supply the power to inverter control systems, the electrically isolated voltage across Cfilt TS 186 may take over the demand of load and keeps an inverter operation fully functional. A rectifying and filter capacitor Cfilt TS 186 may filter any ripples in the voltage rectified by Drect TS 164, resulting in an electrically isolated conditioned output.

The various components in each stage are connected as illustrated in FIG. 1. Some signals may be sensed or generated to be used in various blocks, such as the voltage across Cfilt EHV 106 may be sensed by physically connecting printed circuit board traces across Cfilt EHV 106. Similarly, the voltage across Cfdb 115 may be sensed by physically connecting printed circuit board traces across Cfdb 115. Some signals may be generated by the circuit itself, such as SiC MOSFET EHV Over-Current (OC)/Under-Current (UC). Also, any stage of the multi-stage power supply circuit may be connected with its adjoining stages by a magnetic circuit for power transfer. For a lower voltage signal, a digital isolator may be used, which may use a capacitive-coupled isolator, an indictive-coupled isolator, or a radio-frequency-coupled isolator. The digital isolator passes signals from the input stage 120 to a final block called EHV to TSLV power converter start-up and diagnosis system, where any critical safety decision may be made.

Figure 2:
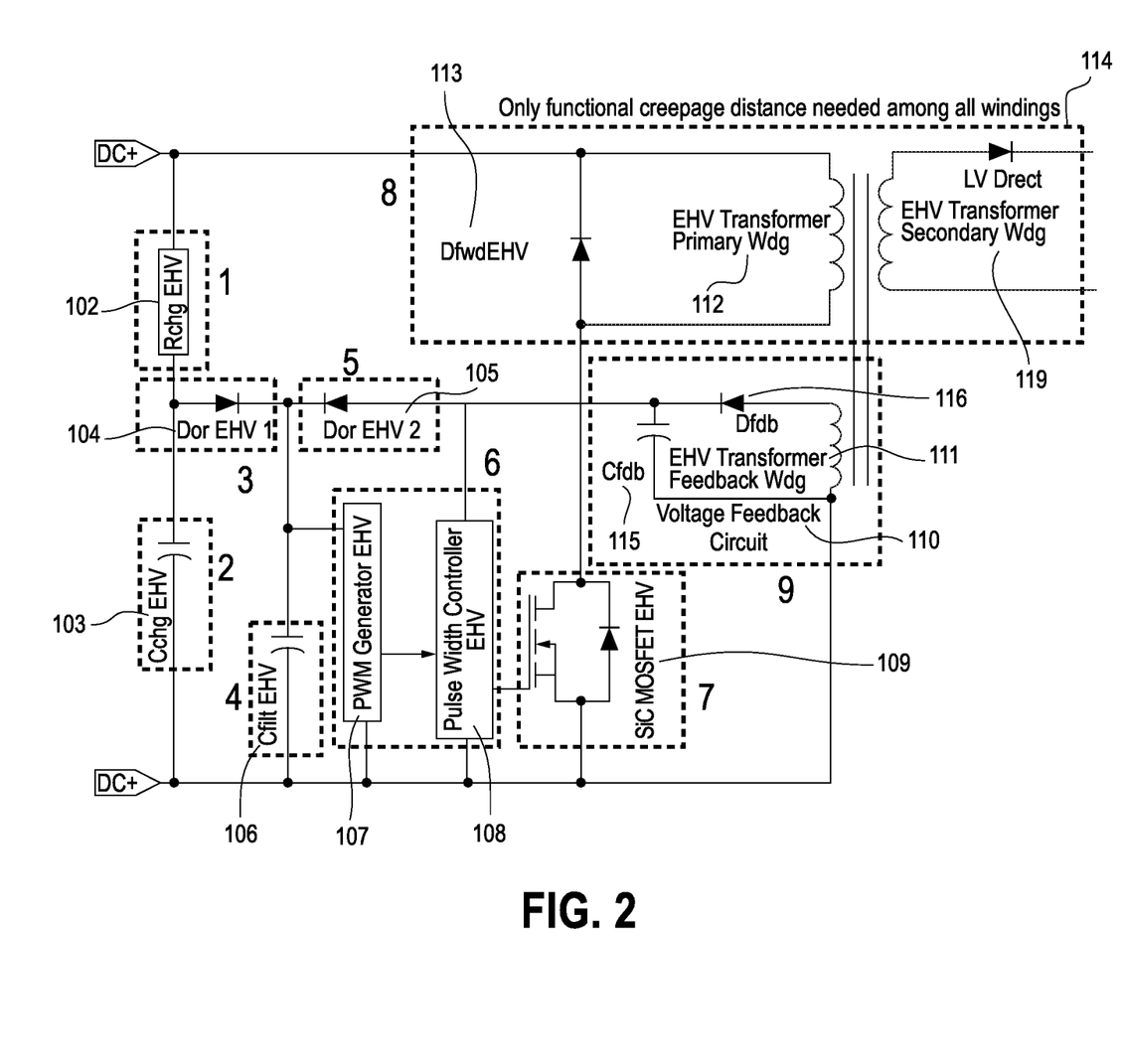
FIG. 2 is a diagram describing an input stage of power supply circuit that is grouped in several blocks in one form of the present disclosure.

FIG. 2 shows a diagram of the input stage 120 of the power supply circuit 100 that is grouped in a number of blocks. In some forms of the present disclosure, the power supply circuit 100 may be connected across the DC bus of the inverter 101. When a vehicle generator starts, the voltage may be built across DC+ and DC− terminals of the power supply circuit 100 and this current flows through block 1 and block 2 from DC+ to Rchg EHV 102 to Cchg EHV 103 to DC−. As a result, Cchg EHV 103 may be charged.

The voltage developed across Cchg EHV 103 may charge Cfilt EHV 106. This charging current to Cfilt EHV 106 may flow mainly using a relatively low impedance path that includes an element in block 3, Dor EHV1 104.

Once Cfilt EHV 106 is charged sufficiently about 9V or so, a regulated power supply starts functioning within block 5, resulting in a PWM pattern generation for SiC MOSFET 109 included in block 7.

The PWM signals are used to turn on/off SiC MOSFET EHV 109. When PWM turns on SiC MOSFET EHV 109, magnetic flux may be built in the core of EHV Transformers. This flux links to EHV Transformer Feedback Wdg 111 and may cause induction of voltage, resulting in charging Cfdb 115.

As soon as Cfdb 115 is charged greater than Cchg EHV 103, the current starts flowing from Cfdb 115 to Cfilt EHV 106 to keep its voltage above a threshold value.

A diode Dor EHV1 104 may ensure that Cfdb 115 doesn't supply current to Cchg EHV 103. Dor EHV1 104 and Dor EHV2 105 may work together as a diode ORed circuit between the voltage across Cchg EHV 103 and the voltage across Cfdb 115. As such, after a start-up of the power supply, Rchg EHV 102 (block 1), Cchg EHV 103 (block 2) and Dor EHV1 104 (block 3) may not affect a normal function of the power supply, or an impedance offered by a path (block 1 to block 2 to block 3 to block 4) may be higher than an impedance offered by another path—Cfdb 115 (block 9) to Dor EHV2 105 (block 5) to Cfilt EHV 106 (block 4). Accordingly, blocks 1-4 may function as the start-up of the power supply to provide a start-up bias power to the PWM Generator EHV 107 contained in block 6. On the other hand, Cfdb 115 (block 9), Dor EHV2 105 (Block 5) and Cfilt EHV 106 (block 4) may function as a source for bias-power required by the PWM Generator EHV 107 (block 6).

The function of each block in FIG. 2 will be explained hereafter. In block 1, Rchg EHV 102 may control the current that flows to Cchg EHV 103. Rchg EHV 102 may also provide a functional creepage distance required between DC+ and a node terminal of Dor EHV1 104. Rchg EHV 102 may also be a charging resistance at the input stage 120 of the power supply circuit 100. It may also serve to prevent current inrush to Cchg EHV 103.

In block 2, Cchg EHV 103 may hold the voltage developed due to the charging current that may flow from DC+ to DC− through Rchg EHV 102 and Cchg EHV 103. Cchg EHV 103 may be a trickle charge capacitor. It gets trickle-charged through Rchg EHV 102 and may provide an initial bias power to low-voltage electronics (e.g. electronics referenced at DC−) at the input stage 120.

In block 3, Dor EHV1 104 may ensure that Cfilt EHV 106 doesn't discharge itself to Cchg EHV 103 when a voltage across Cchg EHV 103 is lower than a voltage across Cfilt EHV 106. Dor EHV1 104 may also ensure that the voltage developed across Cfdb 115 doesn't feed Cchg EHV 103.

Accordingly, the function of block 3 is to ensure that components in blocks 1 and 2 do not affect the operation of the input stage 120 when the input stage 120 starts functioning.

In block 4, Cfilt EHV 106 may hold charge provided by either blocks 1 and 2 or blocks 5 and 9. The voltage across Cfilt EHV 106 may feed power to block 6. Cfilt EHV 106 may ensure that the bias voltage (VcfitEHV) to the low-voltage electronics in the input stage 120 is not subject to undesired voltage ripples. Cfilt EHV 106 may filter out ripple contained in a voltage across Cchg EHV 103 and/or Cfdb 115, whichever is dominant at a given time.

In block 5, Dor EHV2 105 may ensure that Cfilt EHV 106 doesn't discharge itself to Cfdb 115. The blocks 3 and 5 together make sure that, between Cchg EHV 103 and Cfdb 115, whichever has a higher voltage becomes a power source needed by block 6. By design, when the input stage 120 starts functioning, the voltage across Cfdb 115 may be always higher than the voltage across Cchg EHV 103. The diode circuit made of Dor EHV1 104 and Dor EHV2 105 may ensure that more dominant (the least possible impedance) circuits power low-voltage electronics in the input stage 120.

In block 6, there may be a power supply regulator to smoothen power supplied by Cfilt EHV 106. The regulator may ensure that the output of voltage regulator is steady and smooth even though the voltage developed across Cfilt EHV 106 may vary. The block 6 may also contain the PWM Generator EHV 107 to produce a pulse width switching pattern for SiC MOSFET EHV 109 contained in block 7. Based on the voltage across Cfdb 115, the pulse pattern may be further controlled by Pulse Width controller EHV 108. The PWM Generator EHV 107 may watch the voltage across Cfilt EHV 106 and as soon as Vcfilt EHV is above a desired threshold, it may start generating a PWM signal with 50% duty cycle (e.g. 50% time ON and 50% time OFF at 100 KHz). Switching frequency of 100 KHz or any value lower and/or higher is selected by parameters within the PWM Generator EHV 107. The PWM Generator EHV 107 may also generate Vref EHV (a precision reference signal) for reporting the status of the input stage and its comparison with the voltage (Vcfilt EHV) across Cfilt EHV 106. The PWM signal generated by the PWM Generator EHV 107 may be a TTL logic (0V to 5V) signal. The switching edge controller may translate PWM signal from TTL logic (0V to 5V) level to −5V (minimum) to 20V (maximum) such that SiC MOSFET EHV 109 gate-source terminal may be gated properly to turn-off (−5V applied to SiC MOSFET EHV 109) and turn-on (+20V applied to SiC MOSFET EHV 109). Also, depending upon Vcfdb EHV, a switching edge controller may also change a duty cycle of the PWM signal. This may ensure that the input stage 120 produces a desired average voltage across EHV Transformer Secondary Wdg 119.

Block 7 may contain SiC MOSFET EHV 109 that is a high-voltage, high-frequency and high-temperature transistor made of any semiconductor material including Silicon Carbide (SiC), Silicon (si), Gallium Nitride (GaN), Gallium Oxide (Ga2O3), and diamond. The rate of SiC MOSFET EHV 109 may be as high as two times the voltage across DC+ and DC terminals of the input stage 120. The processed PWM signal coming out of block 6 controls the switching pattern of SiC MOSFET EHV 109. Specifically, when SiC MOSFET EHV 109 is turned on, it causes a current to flow between DC+ and DC− terminals via the path DC+ to EHV Transformer Primary Wdg 112 to SiC MOSFET EHV 109 to DC−. This flow of the current builds a magnetic flux in the core of the EHV transformer.

Block 8 contains EHV Transformer Primary Wdg 112, Dfwd EHV 113, EHV Transformer Secondary Wdg 119, and Drect LV 114. The magnetic flux that was built in the core of the EHV Transformer needs to return to a zero flux condition to avoid magnetic saturation. As such, when SiC MOSFET EHV 109 is turned off, the current that flew through path DC+ to EHV Transformer Primary Wdg 112 to SiC MOSFET EHV 109 to DC− takes the least impedance closed path, which is also called as a freewheeling circuit. This freewheeling circuit is very short and closed concerning the components EHV Transformer Primary Wdg 112 to Dfwd EHV 113. Due to a lower impedance offered by the freewheeling circuit, the current developed through EHV Transformer Primary Wdg 112 dies down very quickly when SiC MOSFET EHV 109 is turned on, resulting in resetting of flux in EHV Transformer to a zero state. Accordingly, the freewheeling action ensures that the magnetic flux in EHV Transformer resets to the zero state after each PWM cycle. Due to switching of SiC MOSFET EHV 109, the flux is built in EHV Transformer Primary Wdg 112. This may cause a voltage build-up across EHV Transformer Secondary Wdg 119 as a result of the magnetic induction (also called as transformer action). The induced high-frequency voltage may be rectified by Drect LV 114 and the rectified voltage becomes an input voltage for the next stage. The primary function of Dfwd EHV 113 is to ensure that an average flux developed in the magnetic core of the EHV Transformer remains below a saturation limit. By providing the freewheeling action for the trapped energy in the EHV Transformer, Dfwd EHV 113 confirms that the voltage across SiCMOSFET EHV 109 is clamped below its rated value. A rectifying diode, Drect LV 114, rectifies the voltage across a final secondary winding in the input stage 120.

Block 9 contains three elements: EHV Transformer Feedback Wdg 111, a rectifying diode (Dfdb 116), and a rectifying capacitor (Cfdb 115), respectively. All three elements are collectively called as a feedback circuit. This feedback circuit controls a pulse width pattern issued to SiC MOSFET EHV 109 so that the output power requirement is met properly. The voltage across Cfdb 115 deviates when an output load changes, and hence PWM pattern is adjusted to ensure that voltage across Cfdb 115 returns to a state before the output load was changed. The rectifying diode, Dfdb 116, rectifies the voltage developed across the EHV Transformer Feedback Wdg 111 working together with Cfdb 115. Cfdb 115 minimizes a ripple in the rectified voltage that appeared across Cfdb 115 working along with Dfdb 116.

The transformers provide the isolation and voltage step down between the stages such that the higher DC input voltage is isolated from the lower DC output voltage. Demand for current at the output of the converter in excess of a defined limit will not be met because Dfwd EHV 113 in the input stage 120 and Dfwd LV 163 in the intermediate stage 150 limit the current in the primary winding (EHV Transformer Primary Wdg 112 and LV Transformer Primary Wdg 162) and the secondary winding (EHV Transformer Secondary Wdg 119 and LV Transformer Secondary Wdg 169) in each respective transformer. By way of example, assuming the final output power is 150 W and delivered at 24V, then the output current will be 6.25 A. The present power supply circuit will offer about 60% of power conversion efficiency at each stage. Then, the power at the intermediate stage 150 will be 250 W and the power at the input stage 120 will be approximately 417 W. Therefore, the current at the input stage 120 is 0.17 A drawn from 2400V across DC+ and DC− terminals. If the input voltage is raised to another value (e.g. 4600V), then the input current will be 0.09 A. If the input voltage is lowered to another value (e.g. 1500V), then the input current will be 0.40 A. Accordingly, the input current is changed corresponding to the input voltage. However, the power of the input stage 120 remains the same.

Figure 3:
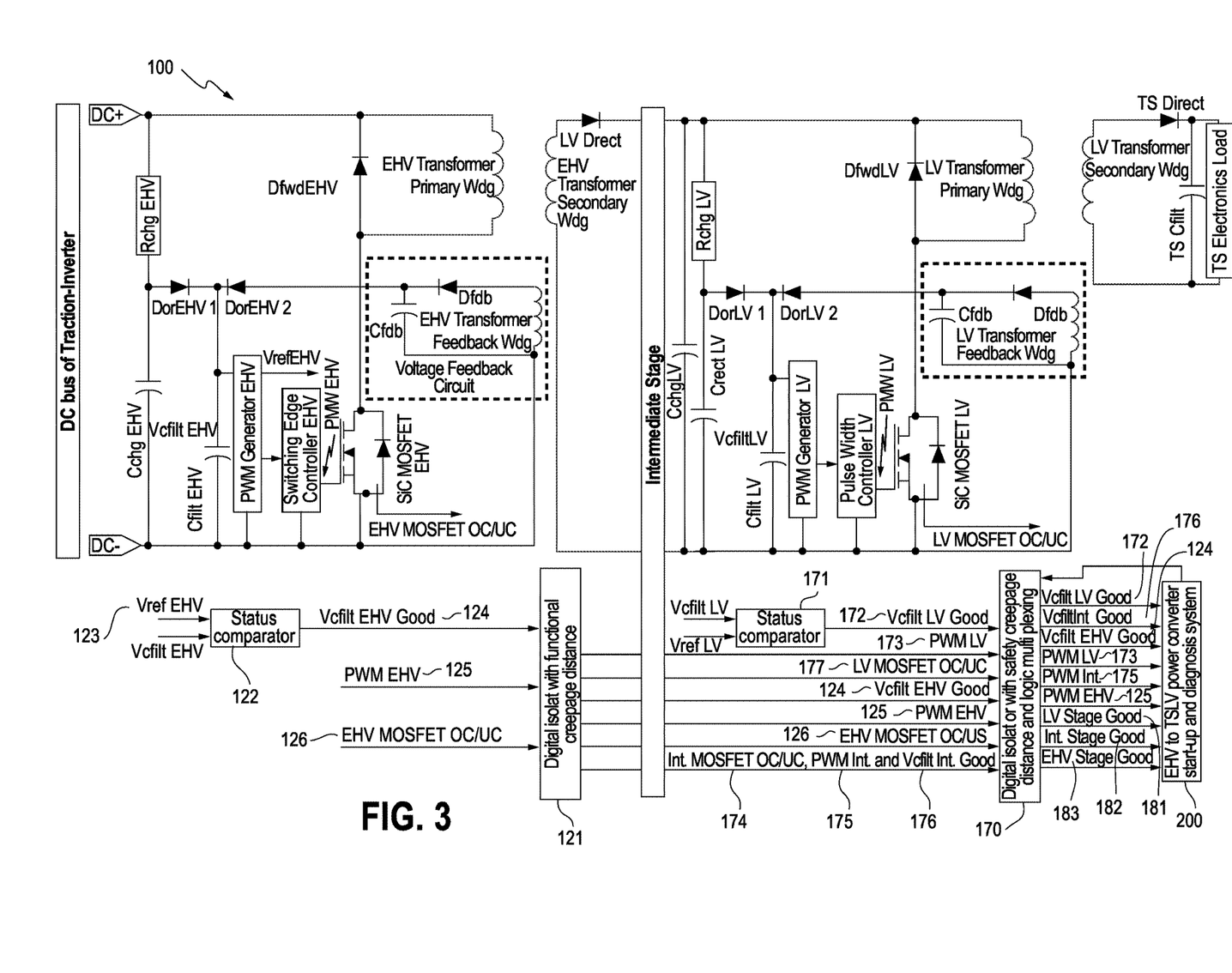
FIG. 3. is a diagram describing the two-stage power supply circuit that includes a diagnosis system in one form of the present disclosure.

FIG. 3 shows a diagram describing a two-stage power supply circuit that includes a diagnosis system in some forms of the present disclosure. In the two-stage power supply circuit, a first digital isolator 121 with a functional creepage distance may be required between the input stage 120 and the intermediate stage 150 and a second digital isolator 170 with the functional creepage distance may be required between the intermediate stage 150 and the output stage 180. The functional creepage distance is almost 50% less than the minimum creepage distance. If the functional creepage distance is breached due to the failure, there may be no risk to the power supply circuit 100. The minimum creepage distance used in the digital isolator detects a single failure such that the power supply circuit 100 could be turned off before it may pose any risk. The minimum creepage distance may refer to the shortest path between two conductors (e.g., different polarity/voltage potential terminals of components) along a dielectric outer surface of a circuit board, for example. However, when the functional creepage distance detects the single failure, it may not provide any opportunity for the shut down of the power supply circuit 100.

Referring to FIG. 3, each digital isolator (the first digital isolator 121 and the second digital isolator 170) may pass a signal from input to the next stage. A first status comparator 122 may compare voltage (Vcfilt EHV) sensed across Cfilt EHV 106 with a reference voltage Vref EHV 123 generated by the PWM generator EHV 107. The output of the first status comparator 122 may be either a logic high or a logic low. The logic-high means the PWM Generator EHV 107 is generating a proper PWM signal, and a low-voltage electronic circuit at the input stage 120 is functional. The logic-low signal, on the other hand, may indicate that the input stage 120 is either not ready yet or might have functional issues. In the power converter start-up and diagnosis system, the safety-critical decisions may be made and status of the power supply may be reported to a system operator where this power supply may be used.

In FIG. 3, each stage may generate three signals: MOSFET OC/UC, PWM and Vcfit Good. These signals are passed from the input stage 120 to the output stage 180 using the first digital isolator 121 and the second digital isolator 170. All digital isolators need to meet only functional creepage distance and voltage rating except a digital isolator used at the output stage 180. Because the output of the output stage 180 needs to be electrically isolated, the digital isolator for the output stage 180 needs a minimum creepage distance and voltage rating. For the output stage 180, the minimum creepage distance and voltage requirements may be satisfied with ease. This may be because of the decreased value of voltage across Crect LV 153, which may be far lower than voltage across traction inverter DC bus CdcInv 430.

Diagnosis signals from each stage are finally aggregated in the digital isolator with the minimum creepage distance and logic multiplexing. The final signals that are sent to the power converter start-up and diagnosis system 200 may be stated as: Vcfilt LV Good 172, Vcfilt Int Good 176, Vcfilt EHV Good 124, PWM LV 173, PWM Int 175, PWM EHV 125, LV Stage Good 181, Int Stage Good 182, EHV Stage Good 183. The power converter start-up and diagnosis system 200 may report status that the EHV to LV power supply is functional and, if required, can kick in as the back-up power when the vehicle battery fails.

If any stage is failed during a normal operation or diagnosis, such as when one of all nine signals not working properly, the power converter start-up and diagnosis system 200 may issue a shut-down (SD LV) signal to the output stage 180. This may inhibit any failure propagating towards electrically isolated electronics in the vehicle. Under this condition, it may be ensured that vehicle battery doesn't fail until EHV to LV power-supply is repaired or replaced. The failure mode may be stopped before it can become a catastrophic failure while mitigating risk for product safety due to the compromised isolation between the input stage 120 and the output stage 180.

Figure 4:
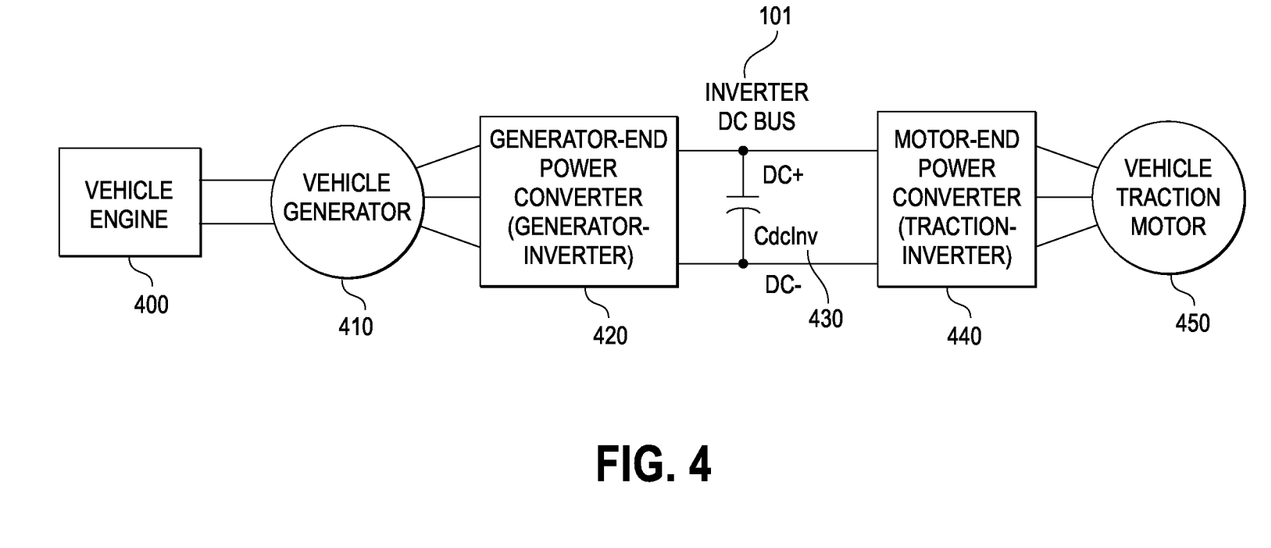
FIG. 4 is a diagram illustrating a basic structure of an engine-powered power train in a vehicle using the two-stage power supply circuit in one form of the present disclosure.

FIG. 4 shows a basic structure of an engine powered power-train in heavy-duty vehicles. The power supply circuit 100 described in FIG. 3 may be connected across DC+ and DC− terminals of the inverter 101 that may be implemented in a heavy-duty electric vehicle. This inverter 101 may be used in the heavy-duty electric vehicle having an internal vehicle engine 400 that may drive a motor or generator with the output converted by the inverter 101. When a vehicle generator 410 starts spinning, a voltage may be built across DC+ and DC− terminals through a generator-inverter 420. This built-up voltage may cause a current to flow from DC+ to DC− terminal of the power supply circuit 100 and this current may flow through block 1 and block 2 described in FIG. 2 using path DC+ to Rchg EHV 102 to Cchg EHV 103 to DC−. As a result, capacitor Cchg EHV 103 may be charged. The inverter 101 may be connected to a traction inverter 440, which may be connected to a vehicle traction motor 450.

The present power supply circuit 100 may be capable of converting from extra high voltage source across inverter DC bus to low voltage to power electronic load of inverter control systems. In particular, the output of the power supply circuit may be isolated from the DC bus such that any ancillary circuitry and electronics (e.g., entertainment system, infotainment system, radio, satellite wireless receiver, cellular phone, satellite navigation system, lights, heat, electric steering, electric air conditioning compressors, and other accessories) may be powered with the benefits of clean, filtered, and isolated low voltage.

In addition, SiC MOSFET voltage rating and their Rds_on may be manageable for creepage distance and thermal conditions. More specifically, SiC MOSFET EHV 109 may have higher Rds_on but far smaller current required for power transfer from the input stage 120 (VDCin) to the intermediate stage 150 (VDCintm). Similarly, SiC MOSFET LV 159 may have lower Rds_on but higher current required to transfer power from the intermediate stage 150 (VDCintm) to the output stage 180 (Vout). Because of balances between RDs_on and current through SiC MOSFET used in the input stage 120 and the intermediate stage 150, respectively, it may allow a flexibility in terms of thermal management and packaging for a properly matched thermal management.

Because the input stage isolation transformer requires the isolation voltage rating and creepage distance only for functional requirements, the input stage transformer may be much smaller than a commonly-used single-stage power conversion system. Due to the smaller size of the input stage transformer, a magnetic circuit may be suitable for encapsulation without any excessive cost burden and this may contribute to reducing the size of the transformer package as well as the overall real-state footprint of the present power supply circuit 100.

Because the intermediate stage 150 may be only required to handle $1/4^{th}$ to $1/3^{rd}$ voltage across DC+ and DC− terminals across the input stage 120, SiC MOSFET LV 159 voltage rating may allow the use of a MOSFET that may have a significant lower Rds_on. Accordingly, despite the higher current handled by the intermediate stage 150, an overall power loss may be relatively low due to the selection of MOSFET having significantly lower Rds_on.

In addition, the present power supply circuit 100 may allow the placement of heat loss in two separate places, which may lead a more suitable design for the thermal management, particularly in applications where the inverter is cooled using an engine coolant, which may be as high as 105 Celcius degree or higher.

Since the loss reduction may be achieved by the degree of freedom between two parameters of MOSFETs (Rds_on and Id), the present power supply circuit 100 may enhance overall efficiency as compared to a single-stage power supply circuit. As a result, the operation of the present power supply circuit 100 at an increased efficiency may allow its applications in inverters designed for an engine coolant application. Due to a modular design approach and part/component commonality between each stage, the present power supply circuit may be manufactured in a very cost-effective way.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A power supply circuit with a plurality of stages for converting a first voltage to a second voltage where the first voltage is greater than the second voltage, wherein each stage of the power supply circuit comprises:
   a first circuit block configured to provide a start-up power to a second circuit block;
   the second circuit block configured to generate a Pulse-Width-Modulation (PWM) signal that controls a pulse duration of a transistor;
   a third circuit block configured to activate or deactivate the transistor based on the PWM signal;
   a fourth circuit block configured to reset a magnetic flux in a transformer to a zero state when the transistor is deactivated; and
   a fifth circuit block configured to maintain an output of a stage below a predetermined value by adjusting a voltage across the transformer,
   wherein the first circuit block comprises:
      a first diode electrically connecting a resistor and a first capacitor, wherein the resistor and the first capacitor are connected to an input of the stage; and
      a second diode electrically connecting a second capacitor and the fifth circuit block,
      wherein the first diode and the second diode are configured to maintain a voltage across a third capacitor included in the fifth circuit block greater than a voltage across the first capacitor when a power supply in the stage is above a predetermined threshold.

2. The power supply circuit of claim 1, wherein the second circuit block comprises:
   a PWM generator electrically connected to a PWM controller, wherein the PWM generator is configured to:
      generate a logic signal indicating whether a sufficient voltage is present at the stage when a voltage across the second capacitor reaches a predetermined state.

3. The power supply circuit of claim 2, wherein the third circuit block comprises:
   the transistor configured to:
      cause a current flow that builds the magnetic flux in the transformer when the transistor is activated; and
      generate a status signal indicating whether an over-current or an under-current is present at the stage.

4. The power supply circuit of claim 3, wherein the fourth circuit block comprises:
   a third diode electrically connected to the transformer; and
   a fourth diode configured to provide a rectified voltage as an input of a next stage,
   wherein the transformer is configured to isolate the input of the stage from the output of the stage.

5. The power supply circuit of claim 4, wherein the fifth circuit block comprises:
   a fifth diode electrically connecting the third capacitor and the transformer, wherein the voltage across the third capacitor is generated to regulate a power flow from the stage to the next stage.

6. The power supply circuit of claim 5, wherein the stage further comprises:
   a status comparator configured to:
      compare the voltage across the second capacitor with the logic signal; and
      output a pass signal when the voltage across the second capacitor meets a predetermined threshold; and
   a digital isolator configured to:
      pass, to another digital isolator included in the next stage, a set of signals including the pass signal, the PWM signal, and the status signal.

7. The power supply circuit of claim 5, wherein a final stage further comprises:
   a power converter diagnosis system configured to:
      receive the set of signals;
      determine whether the stage meets a self-diagnosis measurement; and
      output a diagnosis signal when the stage is determined to meet the self-diagnosis measurement.

8. The power supply circuit of claim 1, wherein a number of the plurality of stages is determined based on a voltage at an input of a first stage.

9. The power supply circuit of claim 1, wherein a functional creepage distance or a minimum creepage distance is maintained within the transformer depending on the stage.

10. A power train in a vehicle comprising:
    a generator connecting an engine and a first power converter;
    a second power converter connected to a motor, wherein the first power converter and the second power converter are connected through a DC bus; and
    a power supply circuit with a plurality of stages configured to convert a first voltage to a second voltage where the first voltage is greater than the second voltage, wherein the power supply circuit is connected to the DC bus,
    wherein each stage of the power supply circuit comprises:
       a first circuit block configured to provide a start-up power to a second circuit block;

the second circuit block configured to generate a Pulse-Width-Modulation (PWM) signal that controls a pulse duration of a transistor;
a third circuit block configured to activate or deactivate the transistor based on the PWM signal;
a fourth circuit block configured to reset a magnetic flux in a transformer to a zero state when the transistor is deactivated; and
a fifth circuit block configured to maintain an output of a stage below a predetermined value by adjusting a voltage across the transformer,
and wherein the first circuit block comprises:
a first diode electrically connecting a resistor and a first capacitor, wherein the resistor and the first capacitor are connected to the DC bus; and
a second diode electrically connecting a second capacitor and the fifth circuit block,
wherein the first diode and the second diode are configured to maintain a voltage across a third capacitor included in the fifth circuit block greater than a voltage across the first capacitor when a power supply in the stage is above a predetermined threshold.

11. The power train of claim 10, wherein the second circuit block comprises:
a PWM generator electrically connected to a PWM controller, wherein the PWM generator is configured to:
generate a logic signal indicating whether a sufficient voltage is present at the stage when a voltage across the second capacitor reaches a predetermined state.

12. The power train of claim 11, wherein the third circuit block comprises:
the transistor configured to:
cause a current flow that builds the magnetic flux in the transformer when the transistor is activated; and
generate a status signal indicating whether an over-current or an under-current is present at the stage.

13. The power train of claim 12, wherein the fourth circuit block comprises:
a third diode electrically connected to the transformer; and
a fourth diode configured to provide a rectified voltage as an input of a next stage,
wherein the transformer is configured to isolate an input of the stage from the output of the stage.

14. The power train of claim 13, wherein the fifth circuit block comprises:
a fifth diode electrically connecting the third capacitor and the transformer, wherein the voltage across the third capacitor is generated to regulate a power flow from the stage to the next stage.

15. The power train of claim 14, wherein the each stage further comprises:
a status comparator configured to:
compare the voltage across the second capacitor with the logic signal; and
output a pass signal when the voltage across the second capacitor meets a predetermined threshold; and
a digital isolator configured to:
pass, to another digital isolator included in the next stage, a set of signals including the pass signal, the PWM signal, and the status signal.

16. The power train of claim 15, wherein a final stage further comprises:
a power converter diagnosis system configured to:
receive the set of signals;
determine whether the each stage meets a self-diagnosis measurement; and
output a diagnosis signal when the each stage is determined to meet the self-diagnosis measurement.

17. The power train of claim 10, wherein a number of the plurality of stages is determined based on a voltage at an input of a first stage.

18. The power train of claim 10, wherein a functional creepage distance or a minimum creepage distance is maintained within the transformer depending on the stage.

* * * * *